United States Patent
Inoue et al.

(10) Patent No.: US 7,347,446 B2
(45) Date of Patent: Mar. 25, 2008

(54) OCCUPANT RESTRAINT APPARATUS

(75) Inventors: Michio Inoue, Aichi-ken (JP);
Toshinori Tanase, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 210 days.

(21) Appl. No.: 11/231,752

(22) Filed: Sep. 22, 2005

(65) Prior Publication Data
US 2006/0066079 A1    Mar. 30, 2006

(30) Foreign Application Priority Data
Sep. 29, 2004  (JP) ............................ P2004-284354
Oct. 1, 2004   (JP) ............................ P2004-290069

(51) Int. Cl.
*B60R 21/16* (2006.01)
(52) U.S. Cl. .................................... 280/730.2
(58) Field of Classification Search ............. 280/730.2, 280/743.2, 730.1
See application file for complete search history.

(56) References Cited

U.S. PATENT DOCUMENTS

| | | | |
|---|---|---|---|
| 6,168,193 B1 * | 1/2001 | Shirk et al. ............... | 280/730.2 |
| 6,237,938 B1 * | 5/2001 | Boxey ....................... | 280/730.2 |
| 6,308,982 B1 * | 10/2001 | Wallner et al. ........... | 280/730.2 |
| 6,431,588 B1 * | 8/2002 | Bayley et al. ............. | 280/730.2 |
| 6,464,250 B1 * | 10/2002 | Faigle et al. .............. | 280/730.2 |
| 6,733,035 B2 * | 5/2004 | Thomas et al. ........... | 280/730.2 |
| 7,159,896 B2 * | 1/2007 | Ochiai et al. ............. | 280/730.2 |
| 2002/0070537 A1 * | 6/2002 | Webber et al. ............ | 280/730.2 |

FOREIGN PATENT DOCUMENTS

JP       A-H10-278723       10/1998

* cited by examiner

*Primary Examiner*—Paul N. Dickson
*Assistant Examiner*—Robert A. Coker
(74) *Attorney, Agent, or Firm*—Posz Law Group, PLC

(57) ABSTRACT

An occupant restraint apparatus includes a head protecting airbag which is housed on an upper part of windows. In the airbag, a front end portion of a lower edge thereof is connected to a pretensioner situated in the vicinity of a lower portion of a pillar portion, via a connecting material, and a rear end portion on the lower edge is connected to a guide block, which engages with a guide rail of a pillar portion, via a connecting material. When the airbag is deployed, a tension is generated in the lower edge of the airbag between the connecting materials by moving the block downward and by hauling by the pretensioner.

4 Claims, 10 Drawing Sheets

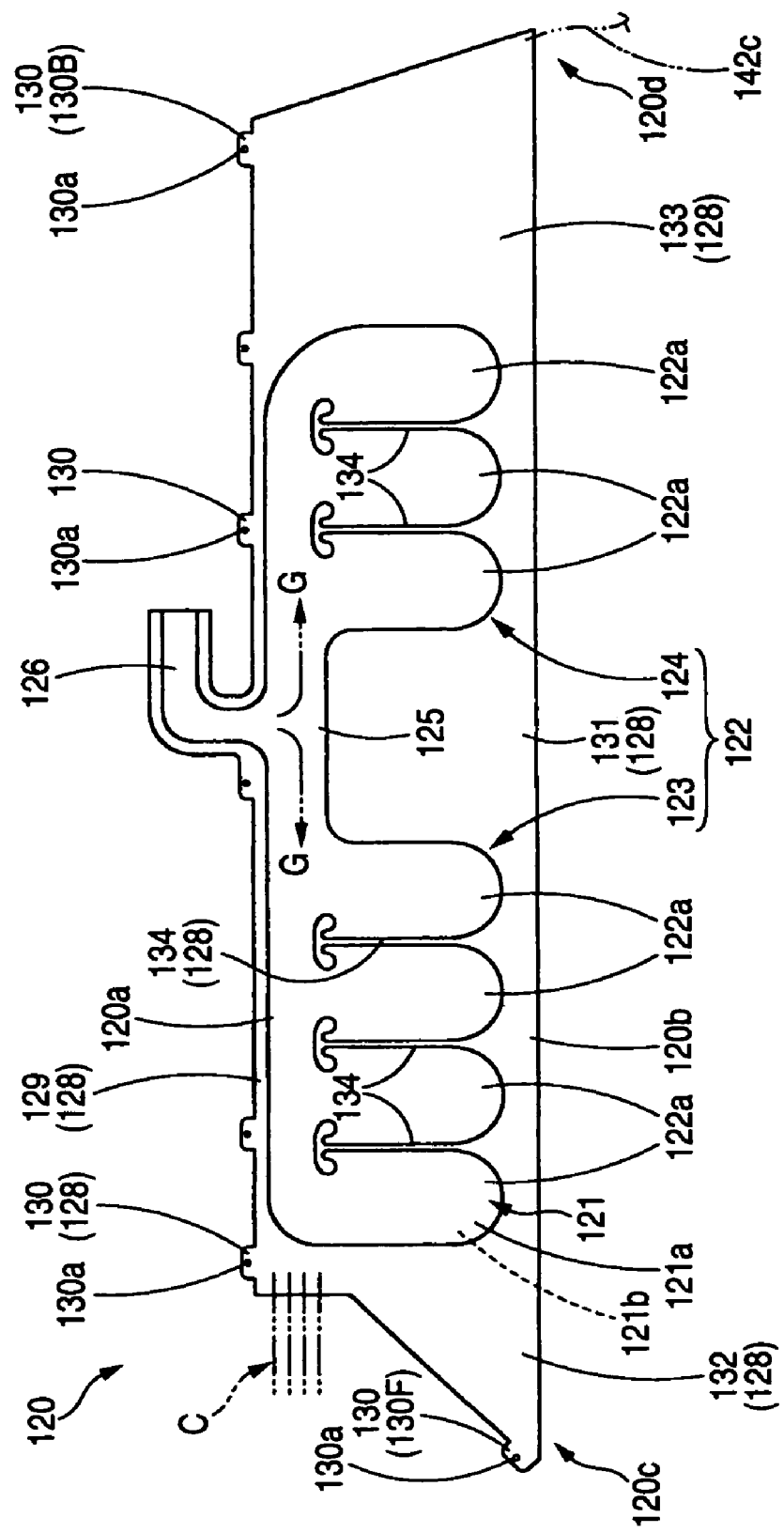

OCCUPANT RESTRAINT APPARATUS

BACKGROUND OF THE INVENTION

1. Field of the Invention

The present invention relates to an occupant restraint apparatus for restraining an occupant within an interior side by covering an interior side of a window of a vehicle.

2. Related Art

Conventionally, in an airbag system including a head protecting airbag which is adapted to be completely inflated so as to cover an interior side of a window of a vehicle, the inflation of the airbag is completed whereupon a tensile force (tension) is generated to be exerted along a longitudinal direction so as to restrain an occupant of the vehicle (refer to, for example, Japanese Patent Publication No. JP-A-10-278723).

Such a tension is generated by providing a plurality of cells within the airbag so as to be juxtaposed in the longitudinal direction to narrow the longitudinal dimension of the airbag to be inflated when an inflating gas is introduced thereinto for completion of the inflation of the airbag and attaching a front end lower portion and a rear end upper portion of the airbag to a lower portion of a front part and a rear portion of an upper part of the window, respectively. Note that the plurality of cells not only function to generate the tension but also contribute to helping the completely inflated airbag to maintain its plate-like shape which extends along the inside of the compartment.

Then, when a tension is generated by the plurality of cells juxtaposed in the longitudinal direction which is exerted along the longitudinal direction of the airbag, even in case the occupant is force to be out of the compartment, the airbag can restrict the outward movement of the occupant so as to restrain the occupant within the compartment.

In the conventional airbag, however, since the front end lower portion and rear end upper portion of the airbag are attached to the lower portion of the front part and the rear portion of the upper part of the window, respectively, while a tension is generated along a line extending upward from the front end lower portion to the rear end upper portion of the airbag when the airbag has been fully inflated for complete deployment, a tension cannot be generated along a part itself which connects the front end lower portion to a rear end lower portion of the airbag when it has been fully inflated for complete deployment or along a lower edge itself of the airbag which extends in the longitudinal direction thereof when the airbag has been fully inflated for complete deployment, and hence there still remains a room to be improved with respect to the performance for restraining the occupant within the inside of the compartment.

Incidentally, while it is considered that the front end lower portion and rear end lower portion of the airbag are both fixed to the side of lower portions of the front and rear parts of the window, in this state, when the airbag is folded to be housed on the upper part of the window, since the longitudinal length of the airbag along the lower edge thereof is not sufficiently long, the housing becomes impossible. On the contrary, in the event that the longitudinal length of the airbag along the lower edge thereof is excessively long, while the airbag can be housed in the upper part of the window, the airbag cannot provide sufficient tension in the lower edge along the longitudinal direction thereof, even when the plurality of cells are inflated.

In addition, in the conventional airbag, since the tension is generated on the lower edge of the airbag by inflating the plurality of cells which are juxtaposed in the longitudinal direction of the airbag, in the event that a situation is called for in which the cells are damaged in association with the roll of the vehicle on to its side, causing a leakage of the inflating gas, whereby the internal pressure of the airbag is reduced, the tension cannot be maintained.

SUMMARY OF THE INVENTION

The invention was made with a view to solving the problems, and an object thereof is to provide an occupant restraint apparatus which allows an airbag to be housed on an upper part of a window and which can generate a tension which is exerted on a lower edge of the airbag along a longitudinal direction of the airbag without being affected by positions of cells in the airbag and reduction in internal pressure of the airbag.

With a view to attaining the object, according to the invention, there is provided an occupant restraint apparatus installed on a vehicle having a window defined between first and second pillar portions, comprising:

an airbag provided with a plurality of cells and folded to be housed on an upper part of the window, said airbag being inflatable downward to cover an interior side of the window by introducing an inflating gas thereinto;

a guide rail extending along the first pillar portion;

a guide block engaged with the guide rail to be guided downward;

a stopper mechanism by which the guide block is engaged with the guide rail so as to allow a downward movement of the guide block and to restrict an upward movement thereof; and a hauling device provided in a vicinity of a peripheral part of the window so as to be connected to a flexible end portion connecting material which is extended from the airbag;

wherein a portion on a lower edge of the airbag, which is disposed in a vicinity of the first pillar portion when the airbag is deployed, is connected to the guide block through a block connecting material, an end portion in the lower edge of the airbag, which is disposed in a vicinity of a lower portion of the second pillar portion when the airbag is deployed, is connected to the end portion connecting material;

wherein, the guide block is moved downward so that the block connecting material moves downward and the hauling device is activated to haul the end portion connecting material, when the airbag is deployed, whereby a tension is generated along a longitudinal direction in the lower edge of the airbag between connection portions connected to the block connecting material and the end portion connecting material, respectively when the airbag has been fully inflated.

In the occupant restraint apparatus according to the invention, when activated, the inflating gas is introduced into the interior of the airbag, so that the airbag is inflated to be deployed downward from the upper part of the window, and the hauling device is also activated to haul the end portion connecting material.

As this occurs, in the vicinity of the first pillar portion on which the guide rail is provided, the guide block is moved downward along the guide rail by the lower edge of the airbag via the block connecting material. Then, since the stopper mechanism is provided at the part where the guide block is made to engage with the guide rail, so that the downward movement of the guide block is allowed but the upward movement of the guide block is restricted, the lower edge of the airbag, which is connected to the block connecting material, is disposed at a lowest position in association with the completion of inflation and deployment of the airbag, and is fixed in place at the position by the guide block, which is stopped by the stopper mechanism, and the block connecting material.

On the other hand, when activated, since the hauling device hauls via the end portion connecting material the longitudinal end of the lower edge of the airbag in a direction in which the longitudinal end of the lower edge of the airbag is moved away from the first pillar portion side along the longitudinal direction of the airbag, the tension is generated which is exerted on the lower edge of the airbag between the connecting parts thereof where the airbag is connected to the block connecting material and the end portion connecting material, respectively, along the longitudinal direction of the airbag when the airbag has been fully inflated for complete deployment.

Then, the tension, which is generated on the lower edge of the airbag between the connecting parts thereof where the airbag is connected to the block connecting material and the end portion connecting material, respectively, is such as to be generated by the hauling device and the guide block which is stopped by the stopper mechanism such that the block connecting material and the end portion connecting material are interposed therebetween, and the tension so generated can be maintained without being affected by the positions where the cells are disposed and even in the event that the internal pressure of the airbag is reduced due to there occurring a gas leakage from the cells, thereby making it possible to exhibit the performance of restraining the occupant within the inside of the compartment.

In addition, in a case where the vehicle on which the airbag is installed also includes a window adjacent to the first pillar portion on a side thereof which is extended from the second pillar portion and the airbag is given a sufficient longitudinal dimension or length to cover the adjacent window, even in the event that an end portion of the airbag, which extends across the first pillar portion so as to move away from the longitudinal end portion side of the airbag which is connected to the end portion connecting material, is made to be fixed to an upper part of the adjacent window to the first pillar portion, since the connecting part on the lower edge of the airbag where the airbag is connected to the block connecting material is stopped at the lowermost end position, a tension can also be generated which is exerted on the lower edge of the airbag along the longitudinal direction thereof from the end portion fixed to the upper part of the adjacent window to the connecting part where the airbag is connected to the block connecting material.

As a result, only if the lower edge of the airbag which is to reside in the vicinity of the first pillar portion when the airbag is inflated for deployment is deployed downward as to lower the block connecting material, or the normal operation of the airbag housed on the upper side of the window is secured in which the airbag is inflated for downward deployment so as to cover the window, the tension can be generated on the whole area of the lower edge of the airbag along the longitudinal direction thereof without being affected by the positions where the cells are disposed.

Then, only if the end portion connecting material, which is connected to the lower edge of the airbag, is made to be retractably fed out of the hauling device by a sufficient length, the airbag can easily be housed on the upper part of the peripheral part of the window.

Consequently, in the occupant restraint apparatus according to the invention, not only can the airbag be housed on the upper part of the window but also the tension can be generated on the lower edge of the airbag along the longitudinal direction thereof without being affected by the positions where the cells are disposed and reduced internal pressure of the airbag.

In addition, since the hauling device may be such as to generate the tension on the lower edge itself of the airbag along the longitudinal direction thereof by the time the internal pressure of the airbag is reduced by virtue of a leakage of the inflating gas caused by the damaged cells due to the roll of the vehicle on to its side after the airbag has been fully inflated for complete deployment, so that the occupant can be restrained within the compartment, the hauling device does not have to be activated as soon as the airbag is deployed but may be activated during the deployment of the airbag, upon the completion of inflation for deployment of the airbag or after the completion of inflation for deployment of the airbag.

In addition, it is possible to use as the hauling device a piston cylinder which utilizes fluid pressure including oil pressure, water pressure, air pressure and expanding gas pressure such as generated from an inflator, a motor which utilizes the fluid pressure and electricity, an electromagnetic solenoid, a spring which makes use of a biasing force generated during recoiling and the like, provided that they can haul the end portion connecting material. Furthermore, from the fact that the hauling device is such as to generate the tension on the lower edge itself of the airbag along the longitudinal direction thereof only after the airbag has been fully inflated for complete deployment when the internal pressure of the airbag is reduced by virtue of the leakage of the inflating gas from the damaged cells or the like, being different from the airbag which is required to spend only a short period of time from the initiation to completion of inflation, the hauling device may be such as to be activated at such a slow speed that takes a certain period of time from the initiation and completion of hauling, and hence, various types of drive sources and drive mechanisms can be utilized as the hauling device.

Furthermore, with a stopper mechanism provided for the hauling device which prevents the end portion connecting material being fed out of the hauling device in an opposite direction to the direction in which the end portion connecting material is hauled, even in the event that the hauling force which hauls the connecting material is not normally exhibited, the state can be maintained in which the tension is generated on the lower edge itself of the airbag.

Then, in the occupant restraint apparatus, a part of the hauling device through which the end portion connecting material is hauled to be taken into the hauling device may be configured so as to be disposed below the lower part of the window and the connecting part of the airbag where the airbag is connected to the block connecting material when it has been fully inflated for complete deployment may be configured so as to be disposed below the lower part of the window. According to these configurations, the whole area of the window from the upper part to lower part thereof is covered by the part of the airbag which extends between the connecting parts thereof where the airbag is connected, respectively, to the block connecting material and the end portion connecting material, whereby the performance of restraining the occupant within the compartment can further be improved.

According to the invention, there is provided an occupant restraint apparatus installed on a vehicle having a window defined by at least one pillar portion, comprising:

an airbag provided with a plurality of cells juxtaposed in a longitudinal direction of the airbag and folded to be housed on an upper part of the window, said airbag being inflatable downward to cover an interior side of the window by introducing an inflating gas thereinto so that the cells are inflated y narrowing in the longitudinal direction;

wherein a stationary end portion of a lower edge of the airbag is attached to a vicinity of an end portion on a lower part of the window, and a movable end portion of the lower edge of the airbag, which is provided on the pillar portion on the peripheral part of the window, the hauling device including:

a screw rod and a guide rod extending around an area defined from a vicinity of an upper part of the window to a vicinity of a lower part of the window such that axial directions thereof become substantially in parallel with each other, a movable piece having a threaded hole which is fittingly screwed on the screw rod and a guide hole through which the guide rod is passed and connected to the movable end portion of the airbag, and a drive source for rotationally driving the screw rod, whereby when the screw rod is rotationally driven, the movable end portion of the airbag which is housed on the upper part of the window is lowered together with the movable piece so as to generate a tension which is exerted on the lower edge of the airbag between the stationary side and movable end portions along a longitudinal direction of the airbag, when an internal pressure of the airbag is reduced.

In the occupant restraint apparatus according to the embodiment, when activated, since the inflating gas is introduced into the plurality of cells to complete the inflation of the airbag, the cells provide a good cushioning characteristic to enable the protection of an occupant and generate the tension which is exerted along the longitudinal direction of the airbag.

In addition, when activated, since the drive source of the hauling device rotationally drives the screw rod, the movable end portion of the airbag housed on the upper part of the window is lowered together with the movable piece so as to generate the tension which is exerted on the lower edge of the airbag between the stationary side and movable end portions along the longitudinal direction. Then, since the hauling device can generate the tension on the lower edge of the airbag irrespective of cells, the tension generated on the lower edge of the airbag along the longitudinal direction can be maintained even in the event that the internal pressure of the airbag is reduced by virtue of, for example, the occurrence of a reduced internal pressure of the airbag triggered by a leakage of inflating gas from the damaged cells which are damaged after the airbag has been fully inflated for complete deployment, thereby making it possible to prevent the reduction in performance of the airbag of restraining the occupant within the inside of the vehicle.

Of course, in the event that the movable piece which is connected to the movable end portion of the airbag is disposed on the upper part of the window so as to be lowered, the airbag can easily be housed on the upper part of a peripheral part of the window.

Consequently, with the occupant restraint apparatus according to the invention, the airbag can be housed on the upper part of the window, and the tension which is generated longitudinally on the lower edge itself of the airbag can be maintained even in the event that the internal pressure of the airbag is reduced after the airbag has been fully inflated.

Note that since the drive source for rotationally driving the screw rod of the hauling device is such as to complete the movement of the movable piece to the lower part of the window by the time the internal pressure of the airbag is reduced by virtue of the occurrence of a leakage of inflating gas from the damaged cells which are damaged in association with the roll of the vehicle on to its side after the airbag has been fully inflated for complete deployment, the drive source does not have to be activated as soon as the airbag starts to be deployed but may be activated in the middle of deployment of the airbag, upon the completion of inflation and deployment of the airbag or after the completion of inflation and deployment of the airbag.

In addition, it is possible to use as the drive source for rotationally driving the screw rod of the hauling device a motor which utilizes fluid pressure including oil pressure, water pressure, air pressure, expanding gas pressure such as generated from an inflator and electricity, a spring which makes use of a biasing force generated during recoiling and the like, provided that they can rotationally drive the screw rod. Furthermore, from the fact that the drive source is such as to generate the tension on the lower edge itself of the airbag along the longitudinal direction thereof only after the airbag has been fully inflated for complete deployment when the internal pressure of the airbag is reduced by virtue of the leakage of the inflating gas from the damaged cells or the like, being different from the airbag which is required to spend only a short period of time from the initiation to completion of inflation, the drive source may be such as to be activated at such a slow speed that takes a certain period of time from the initiation and completion of movement of the movable piece.

Furthermore, since the movable piece of the hauling device, which is connected to the movable end portion, is fittingly screwed on the screw rod so as to be screw moved therealong and is restricted as to its upward movement as long as the screw rod rotates in a predetermined direction, even in the event that the motor is not kept rotationally driven, that is, the motor is kept stopped, the tension that is generated on the lower edge of the airbag can be maintained. In addition, since the movable piece moves downward along the guide rod and the screw rod which are provided to extend along the substantially vertical direction, a portion of the airbag which is in the vicinity of the movable end portion thereof can be lowered without having to be made to protrude toward the inside of the compartment unnecessarily largely.

Then, in the occupant restraint apparatus of the invention, it is preferable that the stationary end portion of the airbag is disposed further downward than the lower part of the window and that the movable piece of the hauling device is provided so that the movable end portion of the airbag is moved to the position situated further downward than the lower part of the window. In these configurations, the whole area of the lower edge of the airbag that is defined between the stationary end portion and the movable end portion when the operation has been completed is disposed further downward than the lower part of the window, whereby the whole area of the window from the upper to lower part thereof is covered by the airbag, and the performance of the airbag of restraining the occupant within the inside of the compartment can further be increased.

BRIEF DESCRIPTION OF THE DRAWINGS

FIG. 9 is a development of an airbag used in the embodiment.

DETAILED DESCRIPTION OF THE
PREFERRED EMBODIMENTS

First Embodiment

Figure 1:
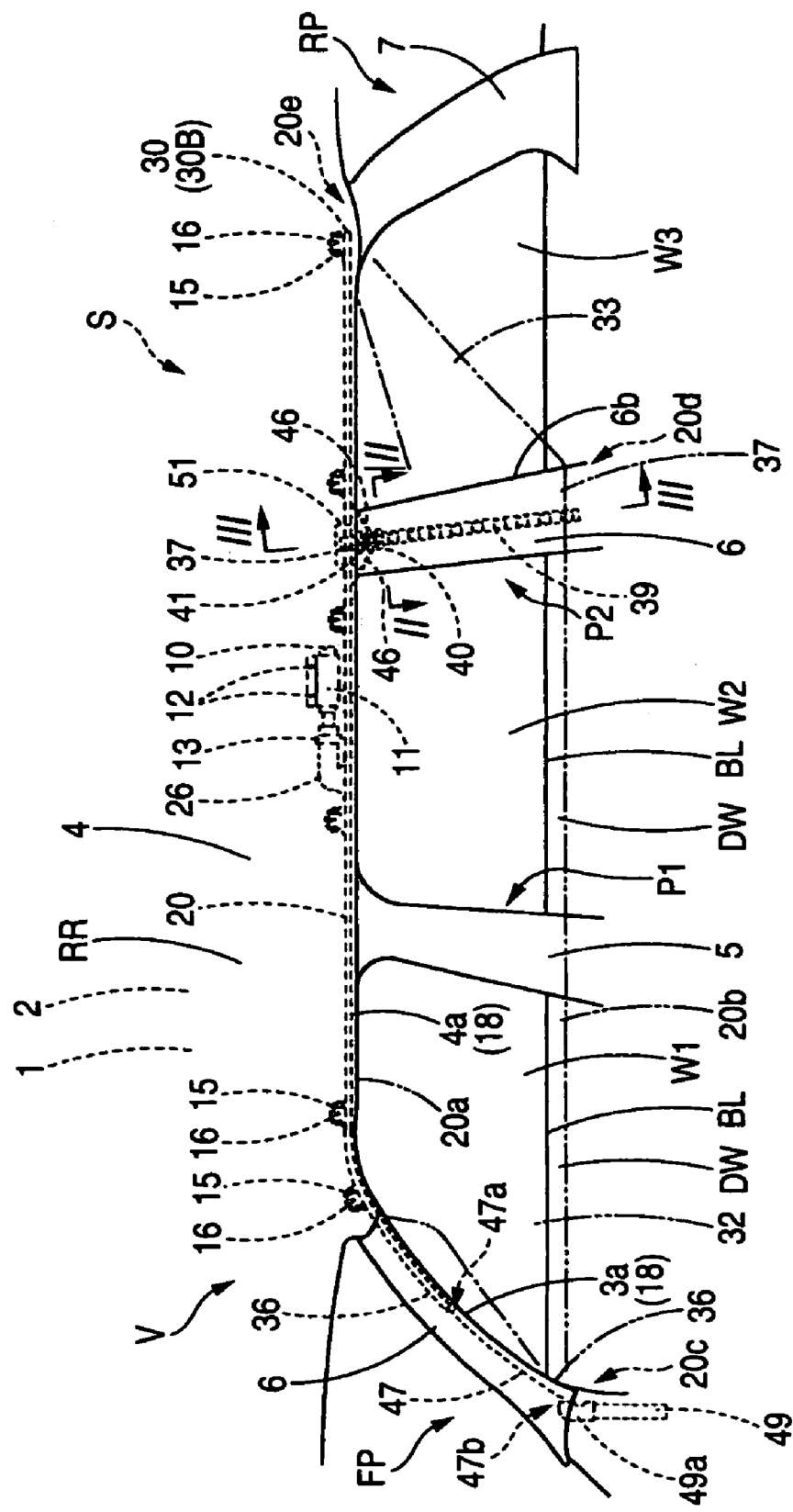
FIG. 1 is a view of an occupant restraint apparatus according to an embodiment of the invention as seen from an inside of a compartment, which shows a state in which the occupant restraint apparatus is installed on a vehicle.

Hereinafter, a first embodiment of the invention will be described. As shown in FIG. 1, in an occupant restraint apparatus S1 of the first embodiment, a head protecting airbag 20 is folded to be housed along a roof side rail RR which extends along upper parts of windows (side windows) W1, W2, W3 of a vehicle V within a range from a front pillar portion FP to the vicinity of a rear pillar portion RP so as to cover the windows W1, W2, W3 when the airbag has been fully inflated for complete deployment. Note that this vehicle V is constructed as a three-row seat type vehicle in which two intermediate pillar portions P1, P2 are provided so as to extend substantially vertically between the front pillar portion FP and the rear pillar portion RP and a seat is provided on an interior side of each of the windows W1, W2, W3, and when has been fully inflated for complete deployment, the airbag 20 is designed to cover not only the windows W1, W2, W3 but also interior sides of pillar garnishes 5, 6 of the pillar portions P1, P2.

Then, in the case of the first embodiment, the intermediate pillar potion P2 corresponds to the first pillar portion of the invention, and the front pillar portion FR corresponds to the second pillar portion of the invention.

As shown in FIG. 1, the occupant restraint apparatus S1 includes the airbag 20, an inflator 10 for supplying an inflating gas for the airbag 20, attachment brackets 11, 15, attachment bolts 12, 16, a guide rail 39 provided on the intermediate pillar portion P2, a guide block 40, block connecting material and end portion connecting material 46, 47 and a pretensioner 49 as a hauling device.

When installed on the vehicle V, the folded airbag 20 and the inflator 10 are housed such that interior sides thereof are covered with an airbag cover 18. In the case of this embodiment, the airbag cover 18 is provided with a lower portion 3a of a front pillar garnish 3 which covers an interior side of the front pillar portion FP and a lower portion 4a of a roof or head lining 4 which covers an interior side of the roof side rail portion RR.

The front pillar garnish 3 and the head lining 4 are made of resin and are attached to an interior side of an inner panel 2 which is a body 1 side member at the front pillar portion FP and roof side rail portion RR with attachment tools, not shown. Then, the airbag cover 18, which is provided with these lower portions 3a, 4a, is made to open toward the inside of the compartment on the side of the lower portions 3a, 4a when pushed by the airbag 20, so that the airbag 20 is allowed to protrude into the compartment when inflated for deployment.

The inflator 10 is formed into a substantially cylindrical shape and a gas discharge port, not shown, is provided at a distal end (front end) thereof for discharging an inflating gas. Then, a distal end portion of the inflator 10 which includes the portion where the gas discharge port is provided is inserted in a connecting port portion 26 of the airbag 20, whereby the inflator 10 is connected to the connecting port portion 26 of the airbag 20 by making use of a clamp 13 which is fitted on the connecting port portion 26 at a near portion to a rear end thereof. In addition, the inflator 10 is attached to the inner panel 2 by making use of the attachment bracket 11 for holding the inflator 10 and the attachment bolt 12 for fixing the attachment bracket 11 to the body 1 side inner panel 2.

Note that the installation of the inflator 10 on the vehicle V is implemented in the form of an assembly unit in which the inflator 10 and the airbag 20 are first assembled together, then, the pretensioner 49 is connected to the airbag 20 with the end portion connecting material 47 interposed therebetween, and then the guide block 40, which is in engagement with the guide rail 39, is connected to the airbag 20 with the block connecting material 46 interposed therebetween.

Figure 4:
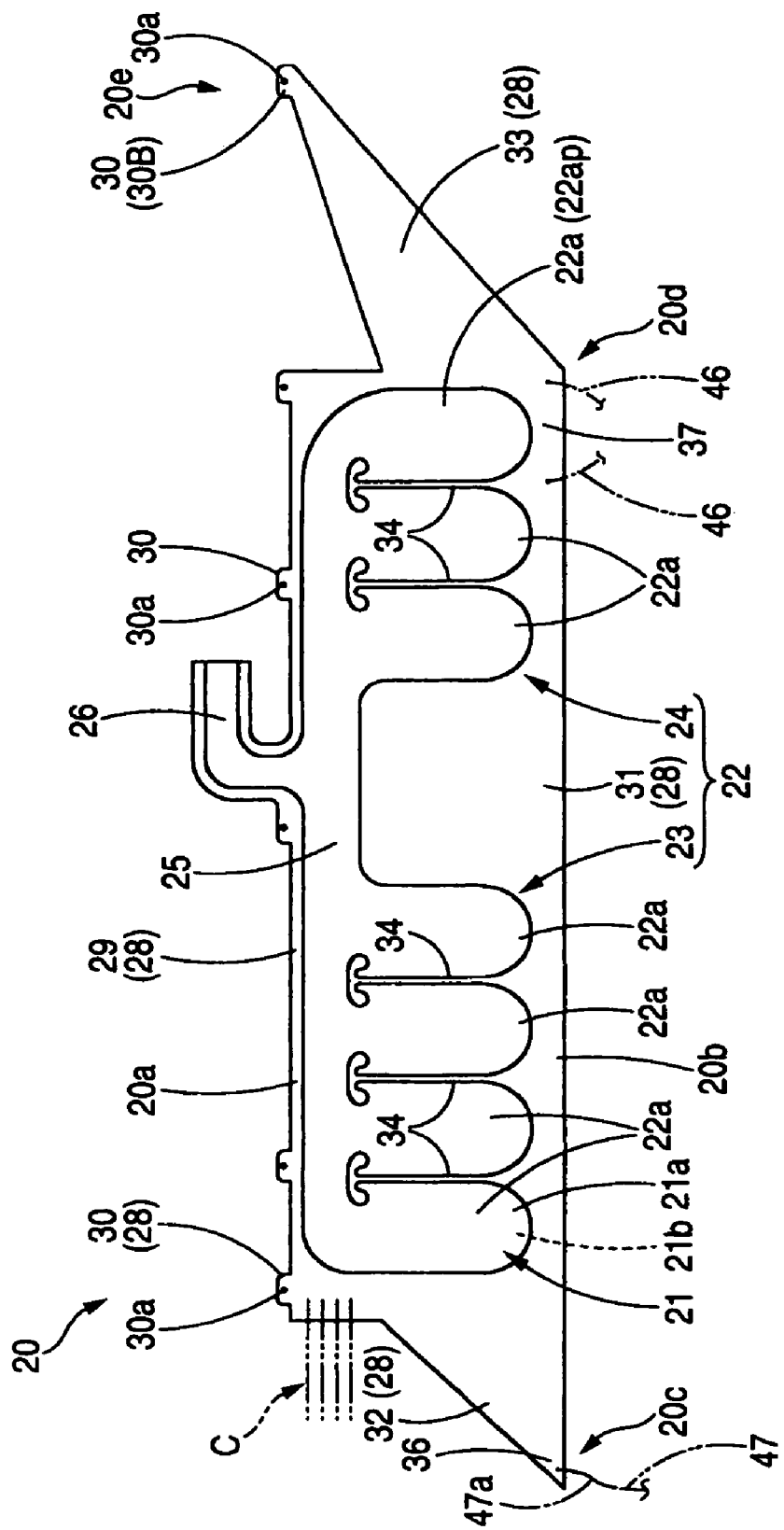
FIG. 4 is a development of an airbag used in the embodiment.

As shown in FIG. 4, the airbag 20 is formed through hollow weave using polyamide threads, polyester threads and the like, and includes a gas introducing portion 21 into which an inflating gas G is introduced to thereby inflated such that an internal wall portion 21a and an external wall portion 21b thereof are separated from each other and a non-introducing portion 28 in which the wall portions 21a, 21b are joined together so that no gas G is allowed to be introduced thereinto. The gas introducing portion 21 includes a protective inflating portion 22, a communicating portion 25 and the connecting port portion 26, and the non-introducing portion 28 includes a peripheral edge portion 29, attachment portions 30, plate-like portions 31, 32, 33 and portioning portions 34.

The protective inflating portion 22 of the gas-introducing portion 21 includes a front protective portion 23 which covers the window W1 by the front seat and a rear protective portion 24 which covers the window W2 by the second-row seat, when the airbag 20 is fully inflated for complete deployment. In addition, the communicating portion 25 is disposed so as to extend along the longitudinal direction of the airbag 20 on an upper edge 20a side of the airbag 20 so as to establish a communication between upper portions of the front protective portion 23 and the rear protective portion 24. Furthermore, the connecting port portion 26 is disposed so as to extend upward from a near portion to a longitudinal center of the upper edge 20a side of the airbag 20 so as to introduce the inflating gas G from the inflator 10 into the communicating portion 25 and the protective inflating portion 22.

Then, the respective protective portions 23, 24 are made to include a plurality of cells 22a which are partitioned by the partitioning portions 34 and the plate-like portion 31 so as to be juxtaposed in the longitudinal direction of the airbag 20 so as to maintain a plate-like shape which extends longitudinally along the windows W1, W2, W3 when the airbag 20 has been fully inflated for complete deployment. Each cell 22a is provided in such a manner as extend vertically like a rod to thereby communicate with the communicating portion 25 at an upper end thereof. In the case of the embodiment, four cells 22a are juxtaposed in the front protective portion 23, whereas three cells 22a are juxtaposed in the rear protective portion 24.

Note that the cell 22a which is disposed in the vicinity of the intermediate pillar portion P2 is made to function as a drive cell 22ap which ensures that the block connecting material 46 is hauled downward when attempting to move the connecting material 46 downward by allowing the inflating gas G to flow downward which is introduced from the communicating portion 25 when the gas G is introduced into the airbag 20.

In addition, in the airbag 20 according to the first embodiment, since the airbag 20 is provided with the plurality of cells 22a which are juxtaposed in the longitudinal direction, in the event that front and rear end parts 20c, 20e are fixed such that the respective end parts are spaced apart from each other at a certain distance, a longitudinal tension can be generated on a lower edge 20b side of the airbag 20.

The peripheral edge portion 29 of the non-introducing portion 28 is disposed on an outer peripheral edge of the gas-introducing portion 21. The plate-like portion 31 is positioned between the front and rear protective portions 23, 24 below the communicating portion 25 and is formed into a substantially rectangular plate-like portion. In addition, the plate-like portion 32 is formed into a triangular plate-like portion which is to be disposed at a front end side of the airbag 20 so as to cover substantially the whole area of the window W1 together with the front protective portion 23 when the airbag 20 is fully inflated for complete deployment. Furthermore, the plate-like portion 33 is formed into a triangular plate-like portion which is to be disposed at a rear end side of the airbag 20 so as to cover a front obliquely upper half portion of the window W3 when the airbag 20 is fully inflated for complete deployment. These plate-like portions 31, 32, 33 are provided not only to secure the overall shape of the airbag 20 but also to reduce the capacity of the portion where the inflating gas G is introduced so as to make a time taken from the initiation to just before the completion of inflation of the airbag 20 as short as possible. Furthermore, the partitioning portions 34 provided between the respective cells 22a are each formed into a T-like shape and are each made to extend upward from the circumferential portion 29 on the lower edge 20b side of the airbag 20.

In addition, the attachment portions 30 are disposed at a plurality of parts on the upper edge 20a side of the airbag 20 so as to protrude upward and are made to include attachment holes 30a for the bolts 16 with which the airbag 20 is fastened to the inner panel 2. The attachment bracket 15 is attached to each attachment portion 30 as a wear plate, so that the attachment portion 30 is fastened to the inner panel 2 together with the attachment bracket 15 with the bolt 16. Note that the attachment portions 30 are not disposed on an upper edge of the plate-like portion 32 but are disposed at an upper edge of the protective inflating portion 22 and a rear end of the plate-like portion 33. An attachment portion 30B is formed at the rear end of the plate-like portion 33, that is, the rear end portion 20e on the upper edge 20a side of the airbag 20 which is disposed on an upper part of the window W3 as an attachment portion which makes a rearmost end.

Then, an end portion 47a of the end portion connecting material 47 is connected to a front end portion of the plate-like portion, that is, the front end portion 20c of the lower edge 20b of the airbag 20 on the lower edge 20b side of the airbag 20, and in addition, the block connecting material 46 is connected to a rear end portion 20d of a rectilinear portion on the lower edge 20b side of the airbag 20.

Note that a shape of the airbag 20 resulting when it is fully inflated for complete deployment in the vehicle installed state is such that on the lower edge 20b side of the airbag 20, the airbag 20 extends rectilinearly along the longitudinal direction thereof from the front end portion 20c to the rear end portion 20d and is positioned downward beyond opening areas of the windows W1, W2, that is, further downward than a belt ling BL downward, while from the rear end portion 20d to the rear end portion 20e of the upper edge 20a, the airbag 20 extends rectilinearly obliquely upward. On the upper edge 20a side of the airbag 20, the shape of the airbag 20 is such that the airbag 20 extends from a lower portion of the front pillar portion FP to a lower portion of the roof side rail portion RR to thereby be disposed as far as a near portion to an upper end of the rear pillar portion RP at a rear end thereof.

Then, the elongated flexible end portion connecting material 47 is connected to the front end portion 20c of the lower edge 20b of the airbag 20 as a connecting portion 36. In the case of this embodiment, the end portion connecting material 47 is provided with a wire.

Then, as shown in FIG. 1, the pretensioner 49 is attached to the inner panel 2 in the vicinity of a lower portion of the front pillar FP such that a hauling port 49a is disposed at an upper end thereof while being oriented rearward. The hauling port 49a is disposed in the vicinity of a front end portion of a lower part DW of a peripheral part of the window W1 as a part from which an end portion 47b of the end portion connecting material 47 which is extended from the end portion 47a which is connected to the airbag 20 is hauled in. Namely, this hauling port 49a is disposed downward beyond the opening area of the window W1, that is, further downward than the belt line BL.

In the case of this embodiment, the pretensioner 49 is provided with a piston cylinder which utilizes oil pressure and is set such that the pretensioner 49 starts to operate at the same time that the inflator 10 is activated. When activated, being supplied with an oil pressure from an oil pressure source, not shown, the pretensioner 49 is made to haul in the end portion 47b of the end portion connecting material 47 from the hauling-in port portion 46.

Note that being provided with a check valve, which constitutes a stopper mechanism, in the interior thereof, the pretensioner 49 is constructed such that a piston, not shown, is prevented from feeding the end portion connecting material 47, which has once been hauled into the pretensioner 49, out of the pretensioner 49 even in case there happens a case where no oil pressure is supplied thereto from the oil pressure source.

Figure 2:
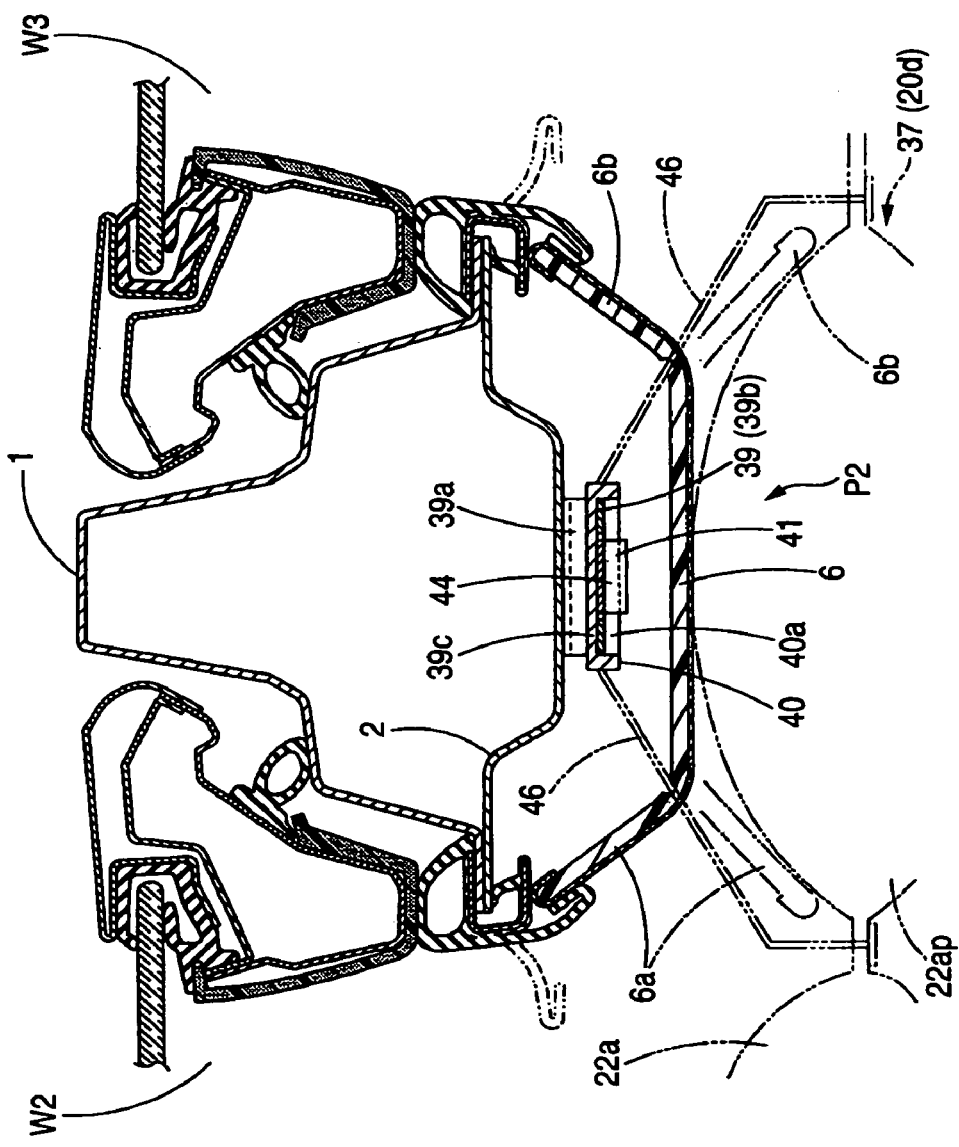
FIG. 2 is a schematic sectional view taken at a part as indicated by arrows II-II in FIG. 1.
Figure 3:
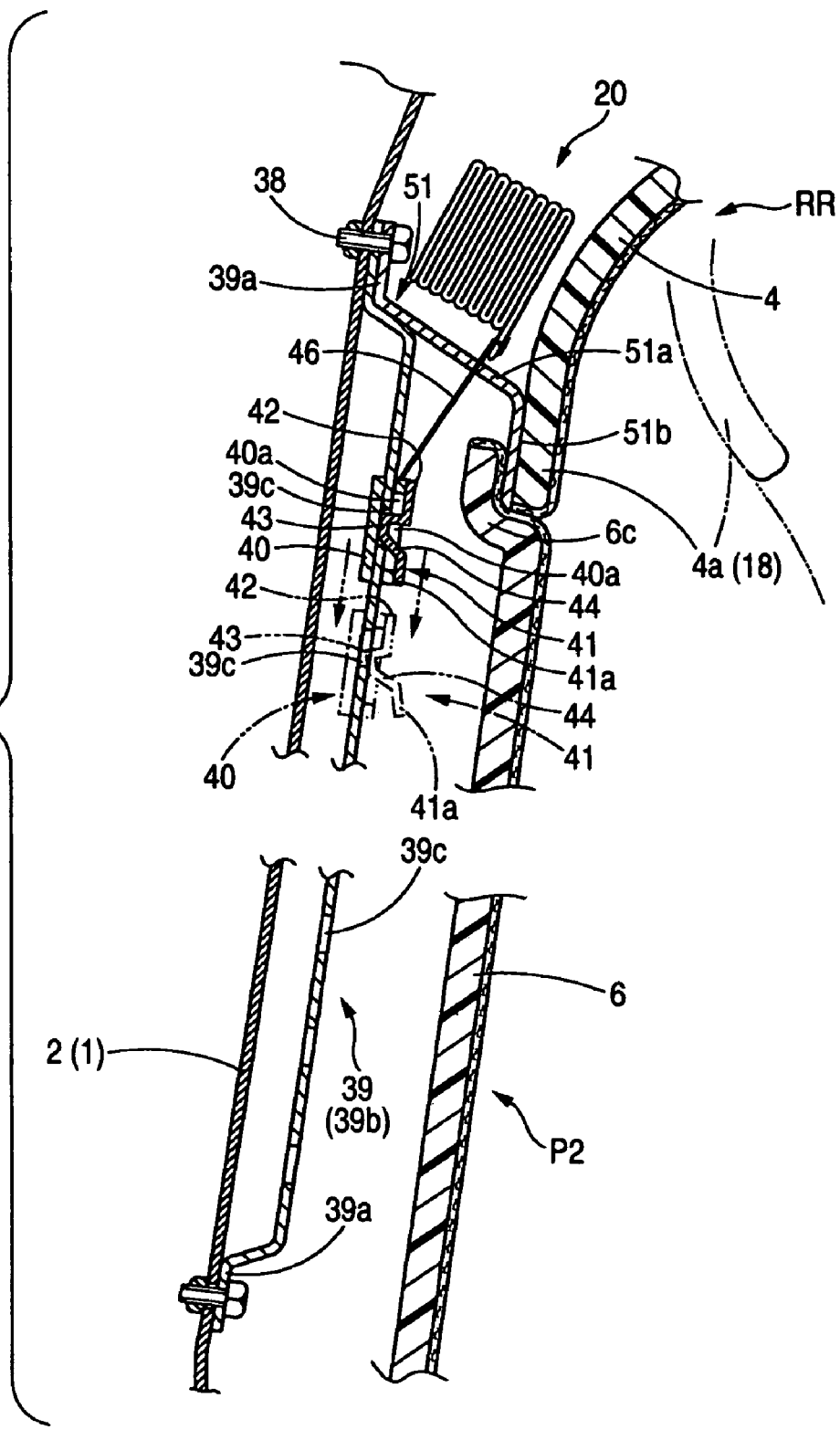
FIG. 3 is a schematic sectional view taken at a part as indicated by arrows III-III in FIG. 1.

The guide rail 39 disposed on the rear intermediate pillar portion P2 is made of a sheet metal and is, as shown in FIGS. 1 to 3, fastened to the body 1 side inner panel 2 of the pillar portion P2 with bolts 38 with upper and lower ends of a vertically extending main body portion 39b being functioning as fixing portions. A plurality of locking holes 39c having rectangular openings are provided in the main body portion 39b in parallel along a vertical direction so as to penetrate the main body portion 39b from an inside to an outside thereof. Note that the guide rail 39 is provided such that a lower end side thereof is displaced rearward in a direction in which the guide rail 39 is spaced away from the pretensioner 49 as the hauling device in order to facilitate the generation of a tension on the lower edge 20*b* of the airbag 20.

The guide block 40, which engages with the guide rail 39, is made of a sheet metal and is formed into a quadrangular tube-like shape which is adapted to be provided on the main body portion 39*b* of the guide rail 39, and an opening 40*a* is provided in an internal wall portion thereof.

Then, a locking pawl 41 constituting a stopper mechanism is attached to an internal peripheral edge of the opening 40*a*. The locking pawl 41 is formed of a spring steel and is provided such that an upper end side fixing portion 42 is fixed to the peripheral edge of the opening 40*a*, whereas a lower end 41*a* side thereof is allowed to be deformed elastically inward or toward the inside of the compartment. Then, a locking portion 43 and a tapered portion 44 are provided on the locking pawl 41 as it extends downward from the fixing portion 42. The locking portion 43 is formed so as to be inserted into the locking hole 39*c* from a lower end side of the fixing portion 42 along an axial direction of the locking hole 39*c*, and the tapered portion 44 is formed so as to extend downward from the vicinity of a distal end of the locking portion 43, as well as being inclined so as to be dislodged from the locking hole 39*c*. When the guide block 40 moves downward along the guide rail 39, the locking pawl 41 deflects the tapered portion 44 which is in abutment with a lower edge of a peripheral edge of the locking hole 39*c* such that the tapered portion 44 is pushed out of the locking hole 39*c* toward the inside of the compartment, so that the guide block 40 is allowed to so move. On the contrary, when the guide block 40 attempts to move upward along the guide rail 39, the locking pawl 41 brings the locking portion 43 into engagement with an upper side of an inner circumferential surface of the locking hole 39*c* so as to restrict the upward movement of the guide block 40.

Furthermore, the block connecting material 46 is connected to the guide block 40, and the block connecting material 46 is connected to a connecting portion 37, that is, the rear end portion 20*b* of the lower edge 20*b* side of the airbag 20, which functions as the connecting portion 37. In the case of this embodiment, the block connecting material 46 is provided with two wire materials which protrude from front and rear sides of the guide block 40 so as to be connected to the circumferential portion 29 on the lower edge 20*b* side of the airbag 20 at positions in the vicinity of sides of the drive cell 22*ap* of the airbag 20, respectively.

In addition, the guide block 40 and the guide rail 39 are covered by the garnish 6 that is disposed on an interior side or inside of the intermediate pillar portion P2, and the garnish 6 has door portions 6*a*, 6*b* which are provided in front and rear edges thereof so as to open inward or toward the inside of the compartment, whereby in association with a downward movement of a lower end side of the drive cell 22*ap*, the front and rear block connecting materials 46, 46 lowers the guide block 40 along the guide rail 39 while pushing the doors 6*a*, 6*b* to open.

Note that in the case of the first embodiment, as shown in FIG. 3, a fixing portion 39*a* and a guide plate 51 made of a sheet metal are provided on the intermediate pillar portion P2 on which the guide rail 39 is provided in order to prevent the airbag 20, when it is inflated to be deployed, from intruding into an outside of the garnish 6, that is, a side of the garnish 6 which faces the inner panel 2 such that the fixing portion 39*a* is disposed at an upper end side of the intermediate pillar portion P2 and the guide plate 51 is fastened to the inner panel with a bolt 38. The guide plate 51 includes an inclined guide portion 51*a* which guide the airbag 20, which is being inflated for deployment, toward the inside of the compartment and a locking portion 51*b* which is made by extending a lower end of the guide portion 51*a*. Then, the locking portion 51*b* is made to function as a holding part which prevents the opening of an upper end portion 6*c* of the garnish 6 toward the inside of the compartment when the door portion 6*a* of the garnish 6 is opened.

In addition, in the case of the first embodiment, the drive cell 22*ap*, the guide rail 39, the connecting materials 46, 46 and the like are set such that the guide block 40 is disposed at a lower side of the opening area of the window W2, that is, further downward than the belt line BL when the guide block 40 moves in a downward direction along the guide rail 39 as the drive cell 22*ap* is forced to move downward via the connecting materials 46, 46 and is then stopped at a lowermost end position thereof by the locking pawl 41 which function as the stopper mechanism.

Then, a lengthwise dimension of the airbag 20 on the lower edge 20*b* side is set such that even in the event that the airbag 20 is not inflated, in case the guide block 40 is stopped at the lowermost end position below the belt line BL, or the front end portion 20*c* is hauled by the pretensioner 49, a tension is generated on the lower edge 20*b* side of the airbag 20 between the front and rear end portions 20*c*, 20*d*, that is, between the connecting portions 36, 37 along the longitudinal direction of the airbag 20, and furthermore, a tension is generated on the lower edge 20*b* side of the airbag 20 between the rear end portion 20*d* and the rear end portion 20*e* on the upper edge 20*a* side of the airbag 20, that is, the connecting portion 37 and the mount portion 30B along the longitudinal direction of the airbag 20.

To describe briefly a process of installing the occupant restraint apparatus S on the vehicle V, the airbag 20 is folded up substantially vertically from a flat deployed state thereof into a bellows while creating creases C (refer to FIG. 4) in parallel with the upper edge 20*a* such that the lower edge 20*b* side approaches the upper edge 20*a* side, thereafter, a breakable wrapping material, not shown, is wound around the circumference of the airbag 20. Furthermore, the respective attachment portions 30 are hauled out so that the predetermined brackets 15 are attached thereto, and the inflator 10, on which the attachment bracket 11 has already been attached, is inserted into the connecting port portion 26, whereby the connecting port portion 26 is connected to the inflator 10 by means of a clamp 13. In addition, the end portion 47*a* of the end portion connecting material 47, which is connected to the pretensioner 49, is connected to the connecting portion 36 (the front end portion 20*c*) of the airbag 20, and then the block connecting materials 46, 46 are connected, respectively, to the guide block 40, which is made to engage with the guide rail 39, and the connecting portion 37 (the rear end portion 20*d*) of the airbag 20, whereby an assembly unit is formed. Then, the respective attachment brackets 11, 15 are disposed at predetermined positions on the inner panel 2 so as to be fastened with the bolts 12, 16, respectively, and the pretensioner 49 and the fixing portions 39*a*, 39*a* of the guide rail 39 are fixed to predetermined positions on the inner panel 2, whereby the assembly unit can be installed on the vehicle V. Note that the guide plate 51 is also fastened together when the fixing portion 39 is fastened with the bolt 38.

Thereafter, a lead wire, not shown, which extends from a control unit for controlling the operation of the inflator, is connected to the inflator 10, and an oil pressure source, not shown, is connected to the pretensioner 49. Then, the front pillar garnish 3 and the head lining 4 are attached to the inner panel 2 on the side of the body 1, and furthermore, the pillar garnishes 5, 6 and a rear pillar garnish 7 are attached to the inner panel 2 on the side of the body 1, whereby the occupant restraint apparatus S can be installed on the vehicle V.

Figure 5:
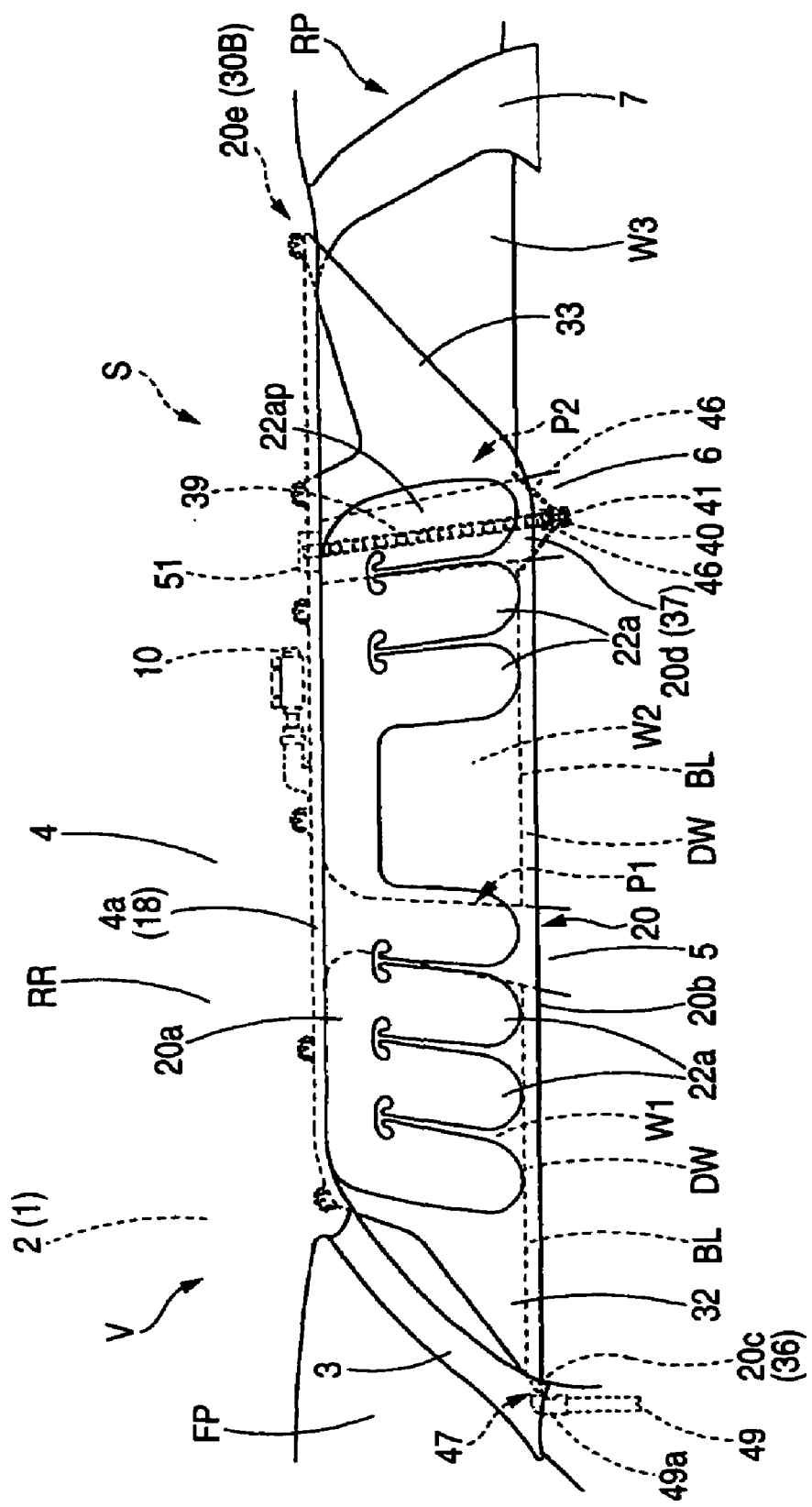
FIG. 5 is a view of the occupant restraint apparatus of the embodiment as seen from the inside of the compartment, which shows a state in which the operation of the occupant restraint apparatus has been completed.

In the occupant restraint apparatus S1 of the embodiment, when activated, since the inflator 10 supplies the inflating gas for the head protecting airbag 20, the airbag 20 introduces the inflating gas so supplied into the communicating portion 25 and the plurality of cells 22a and forcibly opens the airbag cover 18 so as to be deployed downward to cover, as shown in FIG. 5, the interior sides of the windows W1, W2, W3 and the pillar portions P1, P2, whereupon the inflation and deployment thereof is completed. In addition, the pretensioner 49, which functions as the hauling device, also hauls the end portion connecting material 47.

As this occurs, in the vicinity of the intermediate pillar portion P2, the lower edge 20b side of the airbag 20 moves the guide block 40 downward along the guide rail 39 by making use of the drive cell 22ap and the block connecting materials 46, 46. Then, since the locking pawl 41 is provided at the engagement part between the locking portion 43 and the locking hole 39c as the stopper mechanism such that while the downward movement of the guide block 40 is allowed by the tapered portion 44, the upward movement of the guide block 40 is restricted due to the locking portion 43 being brought into locking engagement with the upper side of the inner circumferential surface of the locking hole 39c, the connecting portion 37 on the-lower edge 20b side of the airbag 20, which is connected to the block connecting materials 46, 46, is disposed at the lowermost position as shown in FIG. 5 as the airbag 20 is fully inflated for complete deployment and is then fixed in place at the lowermost position by the guide block 40, which is stopped by the locking pawl 41, and the block connecting materials 46, 46.

On the other hand, when activated, since the pretensioner 49, which functions as the hauling device, hauls the connecting portion 36 (the front end portion 20c), which constitutes one of the longitudinal ends of the lower edge 20b of the airbag 20, in the longitudinal direction in which the connecting portion 36 is moved away from the intermediate pillar portion P2 via the end portion connecting material 47, a tension is generated on the lower edge 20b of the airbag 20 between the connecting portions 36, 37 where the airbag 20 is connected, respectively, to the block connecting material and end portion connecting material 46, 47 along the longitudinal direction of the airbag 20.

Then, the tension, which is generated on the lower edge 20b of the airbag 20 between the connecting portions 36, 37 thereof where the airbag 20 is connected, respectively, to the block connecting material and the end portion connecting material 46, 47, is such as to be generated by the pretensioner 49, which functions as the hauling device, and the guide block 40, which is stopped by the locking pawl 41, which functions as the stopper mechanism, such that the block connecting material and the end portion connecting material 46, 47 are interposed therebetween, and the tension so generated can be maintained irrespective of the positions where the cells 22 are disposed and even in the event that the internal pressure of the airbag 20 is reduced due to there occurring a gas leakage from the cells 22a, thereby making it possible to exhibit the performance of restraining the occupant within the inside of the compartment.

Namely, provided that the connecting part 37 where the airbag 20 is connected to the block connecting material 46 is constructed so as to be moved downward when the airbag 20 is inflated for deployment, the shape of the cells 22a and position where the cells 22a are disposed may be set in any way, and for example, the cells 22a may be provided while being formed into a shape which extends in a transverse direction within the protective portions 23, 24. However, as with the embodiment, it is preferable in case the vertically extending cell 22ap is provided in the vicinity of the guide rail 39, since the guide block 40 can be stopped quickly and at a lower position.

In addition, in the head protecting airbag 20, even in the event that the end portion 20e, which is longitudinally spaced away from the front end portion 20c side which is connected to the end portion connecting material 47 in the longitudinal direction of the airbag 20, is fixed to the upper part of the window W3, since the connecting part 37 where the airbag 20 is connected to the block connecting material 46 on the lower edge 20b side of the airbag 20 is stopped at the lowermost end position, a tension can also be generated which is exerted on the lower edge 20b side of the airbag 20 along the longitudinal direction thereof from the end portion 20e to the connecting portion 37 where the airbag 20 is connected to the block connecting material 46, and as a result, the tension can be generated over the whole area on the lower edge 20b side of the airbag 20 along the longitudinal direction thereof without be being affected by the positions where the cells 22a are disposed.

Then, only if the end portion connecting material 47, which is connected to the front end portion 20c (the connecting portion 36) on the lower edge 20b side of the airbag 20, is made to be retractably fed out of the pretensioner 49 by a sufficient length, the airbag 20 can easily be housed on the upper parts of the windows W1, W2, W3 of the peripheral part thereof.

Consequently, in the occupant restraint apparatus S1 according to the embodiment, not only can the airbag 20 be housed on the upper parts of the windows W1, W2, W3 but also the tension can be generated on the lower edge 20b side of the airbag 20 along the longitudinal direction thereof without being affected by the positions where the cells are disposed and reduced internal pressure of the airbag 20.

Note that since the pretensioner 49, which functions as the hauling device, may be such as to generate the tension on the lower edge 20b itself of the airbag 20 along the longitudinal direction thereof by the time the internal pressure of the airbag 20 is reduced by virtue of a leakage of the inflating gas caused by the damaged cells 22a due to the roll of the vehicle V on to its side after the airbag 20 has been fully inflated for complete deployment, so that the occupant can be restrained within the compartment, the pretensioner 49 does not have to be activated as soon as the airbag 20 is deployed or as soon as the inflator 10 is activated but may be activated during the deployment, upon the completion of inflation for deployment or after the completion of inflation for deployment of the airbag 20.

In addition, since the stopper mechanism, which is provided with a check valve, not shown, is provided on the pretensioner 49 of the embodiment for preventing the end portion connecting material 47 from being fed out of the pretensioner 49 in an opposite direction to the direction in which the end portion connecting material 47 is hauled, even in the event that the oil pressure which exhibits the hauling force which hauls the end portion connecting material 47 is not normally supplied, the state can be maintained in which the tension is generated on the lower edge 20b itself of the airbag 20.

Then, in the first embodiment, the hauling port 49a of the pretensioner 49, which functions as the hauling device, through which the end portion connecting material 47 is hauled to be taken into the pretensioner 49 may be configured so as to be disposed below the belt line BL of the window W1 and the connecting part 37 of the airbag 20 where the airbag 20 is connected to the block connecting material 46 when it has been fully inflated for complete deployment may be configured so as to be disposed below the belt line of the window W2. Due to this, According to these configurations, the whole area of the windows W1, W2 from the upper part to lower part thereof is covered by the part of the airbag 20 which extends between the connecting parts 36, 37 thereof where the airbag 20 is connected, respectively, to the block connecting material and the end portion connecting material 46, 47, whereby the performance of restraining the occupant within the compartment can further be improved.

Note that while, in the embodiment, the whole area of the lower edge 20b of the airbag 20 which covers the windows W1, W2 is configured so as to be disposed below the belt line BL when the hauling device 49 hauls the end portion connecting material 47, at least one of the front end portion 20c and the rear end portion 20d on the lower edge 20b side of the airbag 20 may be disposed below the belt line BL, that is, at least part of the lower edge 20b may be disposed below the belt line BL. Of course, while the area which covers the windows W1, W2 is reduced, the lower edge 20b of the airbag 20 may be configured so as to be disposed above the vicinity of the belt line BL.

In addition, while, in the first embodiment, the connecting portion 37 on the lower edge 20b of the airbag 20 forcibly lowers the guide block 40 when the airbag 20 is inflated for deployment, on the contrary, an unnecessary protrusion toward the inside of the compartment can be suppressed by the guide block 40 which is guided to be moved by the guide rail 39, whereby, even in the event that the occupant is close to the intermediate pillar portion P2, the lower edge 20b of the airbag 20 can be allowed to intrude into a narrow gap between the pillar portion P2 and the occupant.

Furthermore, while, in the first embodiment, the front end portion 20c side, which is the longitudinal end portion of the lower edge 20b of the airbag 20, has been described as being connected to the pretensioner 49, which is located in the vicinity of the lower end of the front pillar portion FP as the hauling device, the arrangement of the relevant components including the airbag 20 itself may be reversed longitudinally, whereby the pretensioner 49, which functions as the hauling device, may be disposed in the vicinity of a lower end of the rear pillar portion RP, and the rear end portion of the lower edge 20b of the airbag 20 may be connected to the pretensioner 49 so disposed via the connecting material 47.

Furthermore, it is preferable in case, as with the first embodiment, the guide rail 39 is disposed not on the intermediate pillar portion P1 which is closer to the pillar portion FP on which the pretensioner 49 is disposed as the hauling device but on the intermediate pillar portion P2 which is extended from the pillar portion FP, the rectilinear part along the belt line BL can be secured long on the lower edge 20b of the airbag 20.

Note that in case the guide rail is provided on the intermediate pillar portion, the part of the airbag which is situated farther away from the part where the hauling device is disposed, in the case of the first embodiment, the plate-like portion 33 may be omitted.

Incidentally, as with the first embodiment, in a case where the part 33 of the airbag 20 is provided beyond the pillar portion P2, in the event that the part 33 is left as the non-introducing portion where no cell 22a is provided as with the first embodiment, a high tension can be maintained on the lower edge 20b of the airbag 20 which connects the connecting portion 37 which is connected to the guide block 40 and the end portion 20e which is provided further rearward than the pillar portion P2 even in case the internal pressure of the airbag is reduced when compared with cells 22a are provided therein.

Furthermore, with the airbag 20 made to so correspond, the pretensioner 49 may be disposed on the front pillar portion FP as the hauling device and the guide rail 39 may be provided on the rear pillar portion RP. Of course, in this case, too, the arrangement of the relevant components may be reversed longitudinally.

Second Embodiment

Figure 6:
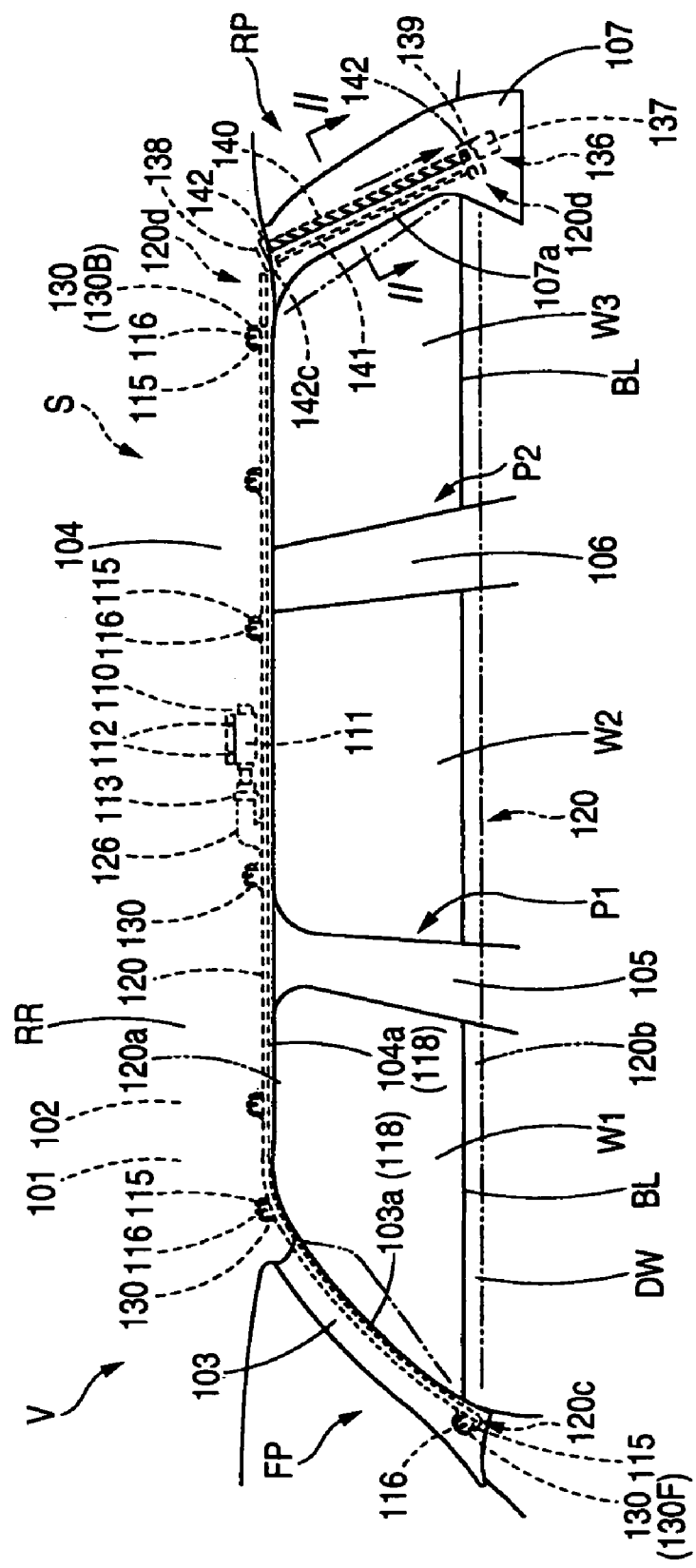
FIG. 6 is a view of an occupant restraint apparatus according to a second embodiment of the invention as seen from an inside of a compartment, which shows a state in which the occupant restraint apparatus is installed on a vehicle.

Hereinafter, a second embodiment of the invention will be described. As shown in FIG. 6, in an occupant restraint apparatus S2 of the second embodiment, a head protecting airbag 120 is folded to be housed along a roof side rail RR which extends along upper parts of windows (side windows) W1, W2, W3 of a vehicle V within a range from a front pillar portion FP to the vicinity of a rear pillar portion RP so as to cover the windows W1, W2, W3 when the airbag has been fully inflated for complete deployment. Note that this vehicle V is constructed as a three-row seat type vehicle in which two intermediate pillar portions P1, P2 are provided so as to extend substantially vertically between the front pillar portion FP and the rear pillar portion RP and a seat is provided on an interior side of each of the windows W1, W2, W3, and when has been fully inflated for complete deployment, the airbag 120 is designed to cover not only the windows W1, W2, W3 but also interior sides of pillar garnishes 105, 106 of the pillar portions P1, P2.

As shown in FIG. 6, the occupant restraint apparatus S2 includes the airbag 120, an inflator 110 for supplying an inflating gas for the airbag 120, attachment brackets 111, 115, attachment bolts 112, 116, and a hauling device 136. The hauling device 136 includes a screw rod 140, a guide rod 141, a movable piece 142 and a motor 137 which functions as a motor for rotationally driving the screw rod 140.

When installed on the vehicle V, the folded airbag 120 and the inflator 110 are housed such that interior sides thereof are covered with an airbag cover 118. In the case of this embodiment, the airbag cover 118 is provided with a lower portion 103a of a front pillar garnish 103 which covers an interior side of the front pillar portion FP and a lower part 104a of a roof or head lining 104 which covers an interior side of the roof side rail portion RR. The front pillar garnish 103 and the head lining 104 are made of resin and are attached to an interior side of an inner panel 102 which is a body 101 side member at the front pillar portion FP and roof side rail portion RR with attachment tools, not shown. Then, the airbag cover 118, which is provided with these lower parts 103a, 104a, is made to open toward the inside of the compartment on the side of the lower parts 103a, 104a when pushed by the airbag 120, so that the airbag 120 is allowed to protrude into the compartment when inflated for deployment.

The inflator 110 is formed into a substantially cylindrical shape and a gas discharge port, not shown, is provided at a distal end (front end) thereof for discharging an inflating gas. Then, a distal end portion of the inflator 110 which includes the portion where the gas discharge port is provided is inserted in a connecting port portion 126 of the airbag 120, whereby the inflator 110 is connected to the connecting port portion 126 of the airbag 120 by making use of a clamp 113 which is fitted on the connecting port portion 126 at a near portion to a rear end thereof. In addition, the inflator 110 is attached to the inner panel 102 by making use of the attachment bracket 111 for holding the inflator 110 and the attachment bolt 112 for fixing the attachment bracket 111 to the body 101 side inner panel 102.

Note that the installation of the inflator 110 on the vehicle V is implemented in the form of an assembly unit in which the inflator 110 and the airbag 120 are first assembled together, and then, the hauling device 136 is connected to the airbag 120 with the movable piece 142 interposed therebetween.

As shown in FIG. 9, the airbag 120 is formed through hollow weave using polyamide threads, polyester threads and the like, and includes a gas introducing portion 121 into which an inflating gas G is introduced to thereby inflated such that an internal wall portion 121a and an external wall portion 121b thereof are separated from each other and a non-introducing portion 128 in which the wall portions 121a, 121b are joined together so that no gas G is allowed to be introduced thereinto. The gas introducing portion 121 includes a protective inflating portion 122, a communicating portion 125 and the connecting port portion 126, and the non-introducing portion 128 includes a peripheral edge portion 129, attachment portions 130, plate-like portions 131, 132, 133 and partitioning portions 134.

The protective inflating portion 122 of the gas-introducing portion 121 includes a front protective portion 123 which covers the window W1 by the front seat and a rear protective portion 124 which covers the window W2 by the second-row seat, when the airbag 120 is fully inflated for complete deployment. In addition, the communicating portion 125 is disposed so as to extend along the longitudinal direction of the airbag 120 on an upper edge 120a side of the airbag 120 so as to establish a communication between upper portions of the front protective portion 123 and the rear protective portion 124. Furthermore, the connecting port portion 126 is disposed so as to extend upward from a near portion to a longitudinal center of the upper edge 120a side of the airbag 120 so as to introduce the inflating gas G from the inflator 110 into the communicating portion 125 and the protective inflating portion 122.

Then, the respective protective portions 123, 124 are made to include a plurality of cells 122a which are partitioned by the partitioning portions 134 and the plate-like portion 131 so as to be juxtaposed in the longitudinal direction of the airbag 120 so as to narrow the width dimension of the airbag 120 in the longitudinal direction and to maintain a plate-like shape of the airbag 120 which extends longitudinally when the airbag 120 is inflated. Each cell 122a is provided in such a manner as extend vertically like a rod to thereby communicate with the communicating portion 125 at an upper end thereof. In the case of the second embodiment, four cells 122a are juxtaposed in the front protective portion 123, whereas three cells 122a are juxtaposed in the rear protective portion 124.

The peripheral edge portion 129 of the non-introducing portion 128 is disposed on an outer peripheral edge of the gas-introducing portion 121. The plate-like portion 131 is positioned between the front and rear protective portions 123, 124 below the communicating portion 125 and is formed into a substantially rectangular plate-like portion. In addition, the plate-like portion 132 is formed into a triangular plate-like portion which is to be disposed at a front end side of the airbag 120. Furthermore, the plate-like portion 133 is formed into a substantially rectangular plate-like portion which is to be disposed at a rear end side of the airbag 120 so as to cover the window W3 when the airbag 120 is fully inflated for complete deployment. These plate-like portions 131, 132, 133 are provided not only to secure the overall shape of the airbag 120 but also to reduce the capacity of the portion where the inflating gas G is introduced so as to make a time taken from the initiation to just before the completion of inflation of the airbag 120 as short as possible. The partitioning portions 134 which are provided between the respective cells 122a are each formed into a T-like shape and are each made to extend upward from the circumferential portion 129 on the lower edge 120b side of the airbag 120.

In addition, the attachment portions 130 are disposed at a plurality of parts on the upper edge 120a side of the airbag 120 which includes the plate-like portions 132, 133 so as to protrude upward and are made to include attachment holes 130a for the bolts 116 with which the airbag 120 is fastened to the inner panel 202. The attachment bracket 115 is attached to each attachment portion 130 as a wear plate, so that the attachment portion 130 is fastened to the inner panel 102 together with the attachment bracket 115 with the bolt 116.

Then, the furthest front end attachment portion 130F is provided at the front end portion 120c of the lower edge 120b of the airbag 120 and is fastened to a part of the inner panel 102 at a lower end of the front pillar portion FP which coincides with the vicinity of a front end portion on a lower part DW side of a peripheral part of the window W1 with a bolt 116.

Since this part of the front end portion 120c coincides with the longitudinal end portion of the lower edge 120b of the airbag 120 and is fixed to the body 101 side, the front end portion 120c constitutes a stationary end portion 120c.

Note that a shape of the airbag 120 resulting when it is fully inflated for complete deployment is such that on the lower edge 120b side of the airbag 120, the airbag 120 extends rectilinearly along the longitudinal direction thereof and is positioned downward beyond opening areas of the windows W1, W2, W3, that is, further downward than a belt ling BL downward. On the upper edge 120a side of the airbag 120, the shape of the airbag 120 is such that the airbag 120 extends from a lower portion of the front pillar portion FP to a lower portion of the roof side rail portion RR to thereby be disposed as far as a near portion to an upper end of the rear pillar portion RP at a rear end thereof.

Then, when the airbag 120 is fully inflated for complete deployment, the rear end portion 120d of the lower edge 120b of the airbag 120 constitutes a movable end portion 120d for connection to the movable piece 142 of the hauling device 136.

Then, as shown in FIGS. 6 to 8C, the hauling device 136 is installed on the vehicle V such that support frames 138, 139 are attached to the inner panel 102 at the vicinities of the upper and lower ends of the rear pillar portion RP, that the screw rod 140 and the guide rod 141, and the movable piece 142 are provided between the support frames 138, 139, and that a motor 137 for rotationally driving the screw rod 140 is attached to the support frame 139.

The screw rod 140 and the guide rod 141 are provided to extend in a substantially vertical direction in an area of the window W3 which is defined from the vicinity of the upper part to the vicinity of the lower part of the window W3 such that axial directions of the screw rod 140 and the guide rod 141 become in parallel with each other, and the screw rod 140 and the guide rod 141 are also provided such that the lower end sides thereof are displaced rearward so as to be spaced away from the stationary end portion 120c of the airbag 120, so that a large tension can be generated on the lower edge 120b of the airbag 120 when the movable piece 142 is moved to a lowermost end position thereof. The screw rod 140 is rotatably supported on the support frames 138, 139, is connected to a drive shaft, not shown, of the motor 137 and is provided further back of the guide rod 141. In addition, the guide rod 141 is supported on the support frames 138, 139 in a stationary fashion.

The movable piece 142 includes a threaded hole 142a which is fittingly screwed on the screw rod 140, as well as a guide hole 142b through which the guide rod 141 is passed. In addition, a short connecting material 142c having flexibility is provided at a front end side of the movable piece 142 for connection to the movable end portion 120d of the airbag 120. Then, when the screw rod 140 is rotationally driven by the motor 137 so as to rotated in a predetermined direction, the movable piece 142, which is in meshing engagement with the screw rod 140, moves downward along the guide rod 141.

Note that since the movable end portion 120d that is housed on the upper part of the window W3 is housed at a position which is situated in the vicinity of an upper portion of the rear pillar portion RP which is concealed by the airbag cover 118, when the airbag 120 is housed on the upper parts of the windows W1, W2, W3, the movable piece 142 is also disposed on the side of the support frame 138 to follow the movable end portion 120d. Then, the movable piece 142 is set such that the lowermost end position that is taken by the movable piece 142 when it is moved downward by virtue of rotational drive of the screw rod 140 is disposed at a position which is further downward than the lower part DW of the window W3, that is, the position below a belt line BL of the window W3. Of course, when the movable end portion 120d is moved downward, even in the event that the airbag 120 is not inflated, a distance between the stationary side and movable end portions 120c, 120d which results when the hauling has been completed is set so that a longitudinal tension is generated on the whole area of the lower edge 120b of the airbag 120 between the stationary side and movable end portions 120c, 120d.

In addition, in the case of this embodiment, an electric motor having a speed reduction mechanism installed therein is used appropriately for the motor 137 of the hauling device 136.

Figure 7:
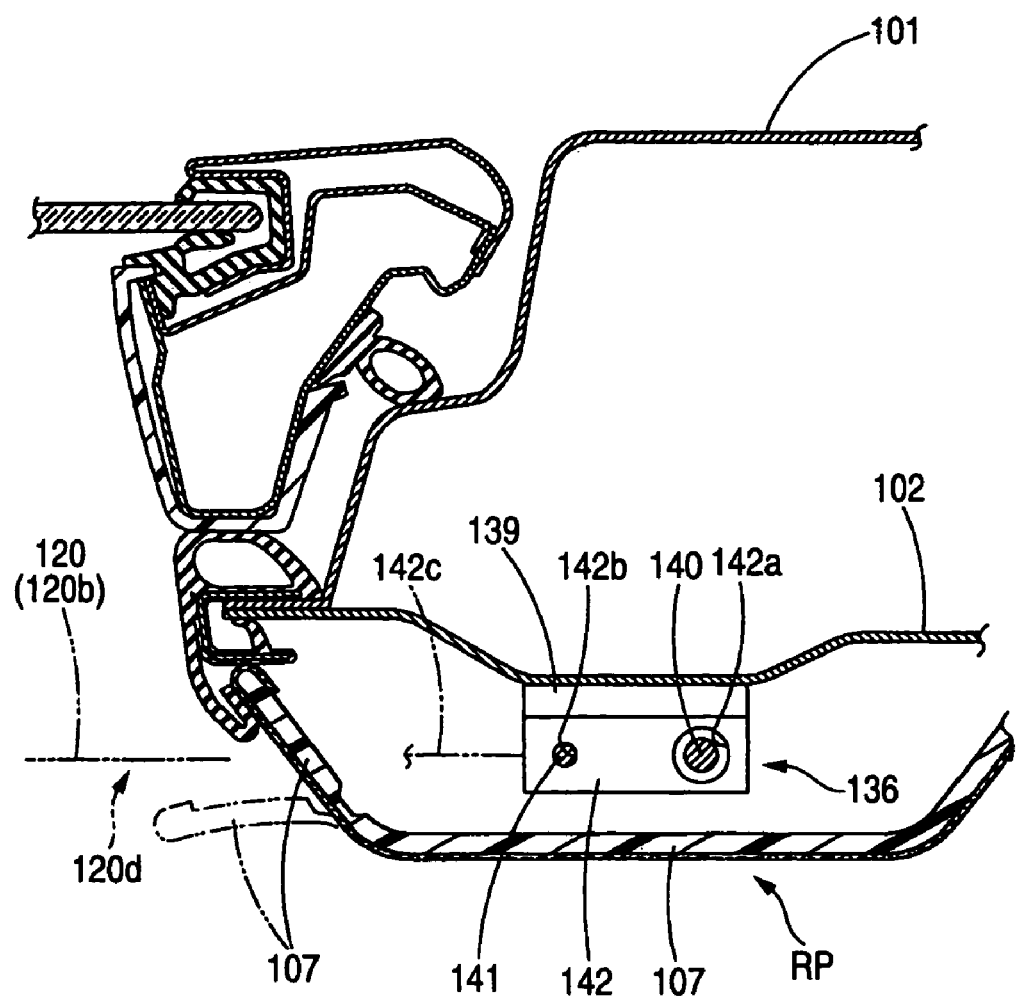
FIG. 7 is a schematic sectional view taken at a part as indicated by arrows VII-VII in FIG. 6.
Figure 8A:
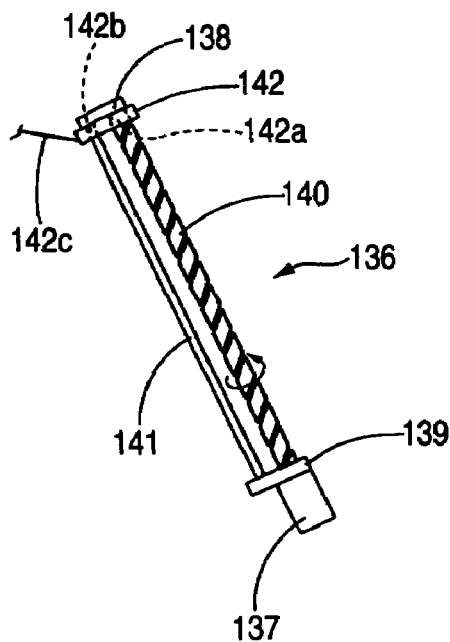
FIGS. 8A, 8B and 8C are schematic views which explain a hauling device of the second embodiment.
Figure 8B:
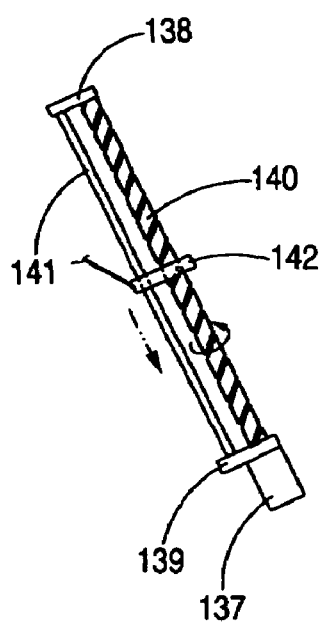
Figure 8C:
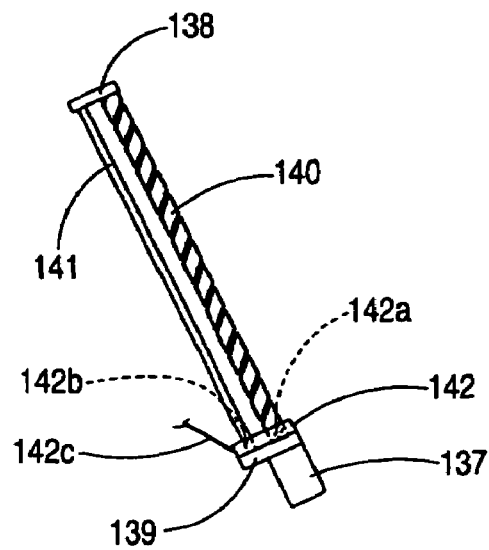

In addition, the hauling device 136 is, as shown in FIGS. 6, 7, installed on the vehicle V such that it is covered by the garnish 107 which is disposed on the interior side of the rear pillar portion RP. A door portion 107a is provided in a front side of the garnish 107 so as to be opened toward the inside of the compartment, and when the movable piece 142 is moved downward, the door portion 107a is forced to be opened by the connecting material 142c and the portion of the airbag 120 which resides in the vicinity of the movable end portion 120d thereof, so that the movable piece 142 is allowed to move downward between the garnish 107 and the inner panel 102 of the rear pillar portion RP.

To describe briefly a process of installing the occupant restraint apparatus S on the vehicle V, the airbag 120 is folded up substantially vertically from a flat deployed state thereof into a bellows while creating creases C (refer to FIG. 9) in parallel with the upper edge 120a such that the lower edge 120b side approaches the upper edge 120a side, thereafter, a breakable wrapping material, not shown, is wound around the circumference of the airbag 120. Furthermore, the respective attachment portions 130 are hauled out so that the predetermined brackets 115 are attached thereto, and the inflator 110, on which the attachment bracket 111 has already been attached, is inserted into the connecting port portion 126, whereby the connecting port portion 126 is connected to the inflator 110 by means of a clamp 113. In addition, the connecting material 142c, which extends from the movable piece 142 of the hauling device 136 which has already been assembled, is connected to the movable end portion 120d of the airbag 120 for completion of the assembly. Then, the respective attachment brackets 111, 115 are disposed at predetermined positions on the inner panel 102 so as to be fastened with the bolts 112, 116, respectively, and the support frames 138, 139 of the hauling device 136 are fixed to predetermined positions on the inner panel 102, whereby the assembly unit can be installed on the vehicle V.

Thereafter, a lead wire, not shown, which extends from a control unit for controlling the operation of the inflator 110 and the motor 137, is connected to the inflator 110 and the motor 137, and the front pillar garnish 103 and the head lining 104 are attached to the inner panel 102 on the side of the body 101. Furthermore, the pillar garnishes 105, 106 and the rear pillar garnish 107 are attached to the inner panel 102 on the side of the body 101, whereby the occupant restraint apparatus S2 can be installed on the vehicle V.

In the occupant restraint apparatus of the second embodiment, when activated, since the inflator 110 supplies the inflating gas for the airbag 120, the airbag 120 introduces the inflating gas so supplied to the communicating portion 125 and the plurality of cells 122a so that the airbag 120 is deployed downward while forcibly opening the airbag cover 118 so as to cover the interior sides of the windows W1, W2, W3 and the pillar portions P1, P2, whereupon the inflation and deployment of the airbag 120 is completed.

Figure 10:
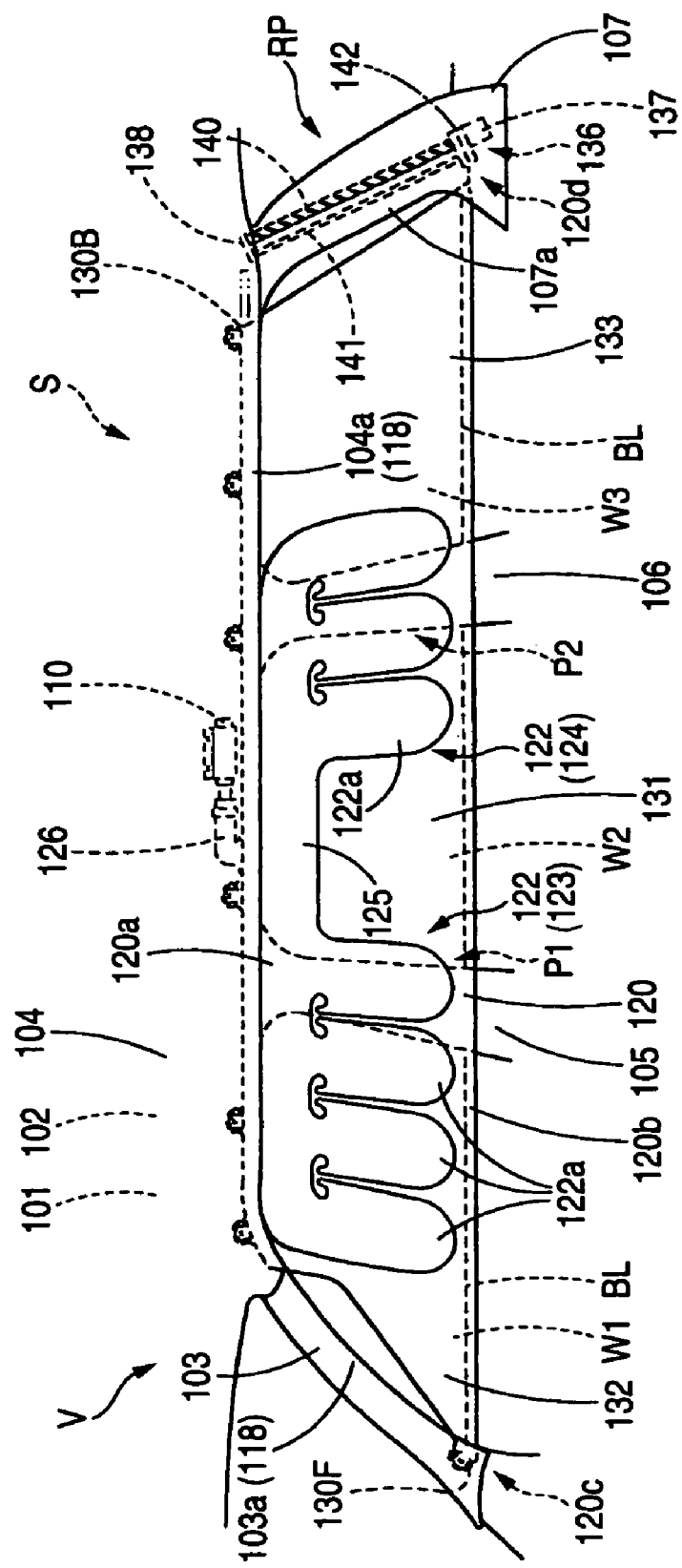
FIG. 10 is a view of the occupant restraint apparatus of the second embodiment as seen from the inside of the compartment, which shows a state in which the operation of the occupant restraint apparatus has been completed.

Then, when the airbag 120 completes the inflation thereof, the plurality of cells 122a provide a good cushioning characteristic to protect the occupant, and the tension is generated along the longitudinal direction of the airbag. Note that a tension that is to be generated only by the cells 122a is generated on an oblique line which connects the attachment portions 130F, 130B at the front and rear ends of the airbag 120 (refer to FIG. 10).

In addition, since the motor 137 of the hauling device 136 starts to operate to rotationally drive the screw rod 140 in association with the activation of the inflator 110, the movable end portion 120d of the airbag 120, which is housed on the upper part of the window W3, is lowered together with the movable piece 142 which is guided by the guide rod 141 to thereby be disposed at the lowermost end position which is situated further downward than the belt line BL of the window W3, whereby the longitudinal tension is generated on the lower edge 120b of the airbag 120 between the stationary side and movable end portions 120c, 120d.

Then, since the hauling device 136 can generate the tension on the lower edge 120b of the airbag 120 irrespective of the cells 122a, the tension that is generated on the lower edge 120b of the airbag 120 along the longitudinal direction thereof can be maintained even in the event that, after the airbag 120 has been fully inflated for complete deployment, the cells 122a are damaged by the road surface through the windows W1, W2 which are opened when the vehicle V is caused to roll on to its side to thereby cause a leakage of inflating gas, resulting in a reduced internal pressure of the airbag 120, thereby making it possible to prevent the reduction in performance of the airbag 120 of restraining the occupant within the inside of the compartment.

Of course, when the movable piece 142, which is connected to the movable end portion 120d of the airbag 120 is, as shown in FIG. 6, disposed on the upper part of the window W3 so as to be lowered, the airbag 120 can be housed on the lower portion of the front pillar portion FP which constitutes the upper parts of the windows W2, W3 to the lower portion of the roof side rail portion RP.

Consequently, in the occupant restraint apparatus S2 of the embodiment, the airbag 120 can be housed on the upper parts of the windows W1, W2, W3 and the longitudinal tension generated on the lower edge 120b itself of the airbag 120 can be maintained even in case the internal pressure of the airbag 120 is reduced after the airbag 120 has been fully inflated for complete deployment.

Note that since the motor 137 of the hauling device 136 is such as to generate the tension on the lower edge 120b itself of the airbag 120 so as to restrain the occupant within the inside of the compartment by the time the internal pressure of the airbag 120 is reduced by virtue of the occurrence of a leakage of inflating gas from the damaged cells 122a which are damaged in association with the roll of the vehicle V on to its side after the airbag 120 has been fully inflated for complete deployment, the motor 137 does not have to be activated as soon as the airbag starts to be deployed, that is, as soon as the inflator 110 is activated but may be activated in the middle of deployment, upon the completion of inflation and deployment or after the completion of inflation and deployment of the airbag 120.

In addition, in the second embodiment, since the movable piece 142 of the hauling device 136, which is connected to the movable end portion 120d, is fittingly screwed on the screw rod 140 so as to be screw moved therealong and is restricted as to its upward movement as long as the screw rod 140 rotates in a predetermined direction, even in the event that the motor 137 is not kept rotationally driven, that is, the motor 137 is kept stopped, the tension that is generated on the lower edge 120b side of the airbag 120 can be maintained. In addition, since the movable piece 142 moves downward along the guide rod 140 and the screw rod 141 which are provided to extend along the substantially vertical direction, the portion of the airbag 120 which is in the vicinity of the movable end portion 120d thereof can be lowered without having to be made to protrude toward the inside of the compartment unnecessarily largely.

Then, in the embodiment, the stationary end portion 120c of the airbag 120 is disposed further downward than the belt line BL of the window W1, and the movable end portion 120d of the airbag 120 is also disposed further downward than the belt line BL of the window W3 by making use of the movable piece 142 of the hauling device 136, whereby the whole area of the lower edge 120b of the airbag 120 that is defined between the stationary end portion 120c and the movable end portion 120d when the operation has been completed is disposed further downward than the belt lines BL of the windows W1, W2, W3, whereby the whole area of the windows W1, W2, W3 from the upper to lower parts thereof is covered by the airbag 120, and the performance of the airbag 120 of restraining the occupant within the inside of the compartment can further be increased.

Note that while, in the embodiment, the whole area of the lower edge 120b of the airbag 120 is configured so as to be disposed further downward than the belt lines BL when hauled by the hauling device 136, only one of the stationary end portion 120c and the movable end portion 120d of the lower edge 120b of the airbag 120 may be disposed below the belt lines BL, that is, at least part of the lower edge 120b may be disposed below the belt lines BL. Of course, while the area is reduced which covers the windows W1, W2, W3, the lower edge 120b of the airbag 120 may be configured so as to be disposed above the vicinity of the belt lines BL.

In addition, while, in the embodiment, the front end portion 120c side of the lower edge 120b of the airbag 120 is described as being fixed to the inner panel 102 on the side of the body 101, whereas the rear end portion 120d side thereof is described as being connected to the connecting material 135, the arrangement of the relevant components including the hauling device 136 may be reversed longitudinally, whereby the movable piece 142 may be connected to the front end portion 120c side, whereas the rear end portion 120d side may be fixed to the inner panel 102 on the side of the body 101.

What is claimed is:

1. An occupant restraint apparatus installed on a vehicle having a window defined between first and second pillar portions, comprising:

an airbag provided with a plurality of cells and folded to be housed on an upper part of the window, said airbag being inflatable downward to cover an interior side of the window by introducing an inflating gas thereinto;

a guide rail extending along the first pillar portion;

a guide block engaged with the guide rail to be guided downward;

a stopper mechanism by which the guide block is engaged with the guide rail so as to allow a downward movement of the guide block and to restrict an upward movement thereof; and a hauling device provided in a vicinity of a peripheral part of the window so as to be connected to a flexible end portion connecting material which is extended from the airbag;

wherein a portion on a lower edge of the airbag, which is disposed in a vicinity of the first pillar portion when the airbag is deployed, is connected to the guide block through a block connecting material, an end portion in the lower edge of the airbag, which is disposed in a vicinity of a lower portion of the second pillar portion when the airbag is deployed, is connected to the end portion connecting material;

wherein, the guide block is moved downward so that the block connecting material moves downward and the hauling device is activated to haul the end portion connecting material, when the airbag is deployed, whereby a tension is generated along a longitudinal direction in the lower edge of the airbag between connection portions connected to the block connecting material and the end portion connecting material, respectively when the airbag has been fully inflated; and wherein the guide rail is located within the first pillar portion, and the block connecting material, which connects the guide block and one of the connection portions of the airbag, includes two wires that protrude from front and rear sides of the guide block when the bag deploys.

2. An occupant restraint apparatus according to claim 1, wherein the hauling device is configured such that a hauling port of the hauling device through which the end portion connecting material is hauled to be taken into the hauling device is located below the lower part of the window, and the connection portion of the airbag at which the block connecting material, is connected is located below the lower part of the window when the airbag has been fully inflated.

3. An occupant restraint apparatus installed on a vehicle having a window defined by at least one pillar portion, comprising:

an airbag provided with a plurality of cells juxtaposed in a longitudinal direction of the airbag and folded to be housed on an upper part of the window, said airbag being inflatable downward to cover an interior side of the window by introducing an inflating gas thereinto so that the cells are inflated by narrowing in the longitudinal direction, wherein a stationary end portion of a lower edge of the airbag is attached to a vicinity of an end portion on a lower part of the window, and a movable end portion of the lower edge of the airbag is provided on the pillar portion on the peripheral part of the window; and a hauling device including:

a screw rod and a guide rod extending around an area defined from a vicinity of an upper part of the window to a vicinity of a lower part of the window such that axial directions thereof become substantially in parallel with each other, a movable piece having a threaded hole, by which the movable piece is threaded on the screw rod, and a guide hole through which the guide rod is passed and connected to the movable end portion of the airbag, and a drive source for rotationally driving the screw rod, whereby when the screw rod is rotationally driven, the movable end portion of the airbag which is housed on the upper part of the window is lowered together with the movable piece so as to generate a tension which is exerted on the lower edge of the airbag between the stationary end and movable end portions along a longitudinal direction of the airbag, when an internal pressure of the airbag is reduced.

4. An occupant restraint apparatus according to claim 3, wherein the stationary end portion of the airbag is disposed further downward than the lower part of the window, and the movable piece of the hauling device is provided so as to move the movable end portion of the airbag to a position which is situated further downward than the lower part of the window.

* * * * *